Aug. 19, 1930.          G. CARWARDINE          1,773,218
SUSPENSION FOR AUTOMOBILES AND THE LIKE
Filed Oct. 2, 1926          2 Sheets-Sheet 1
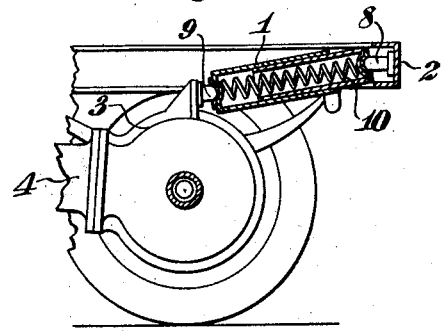
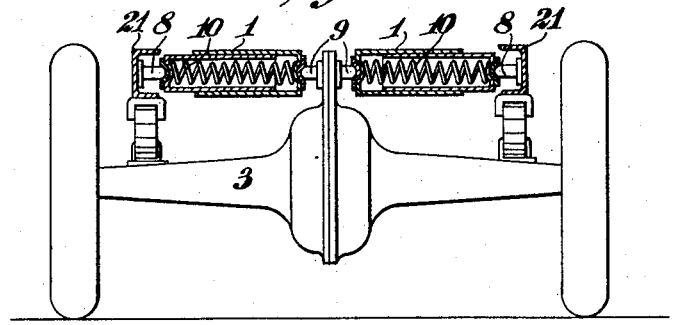
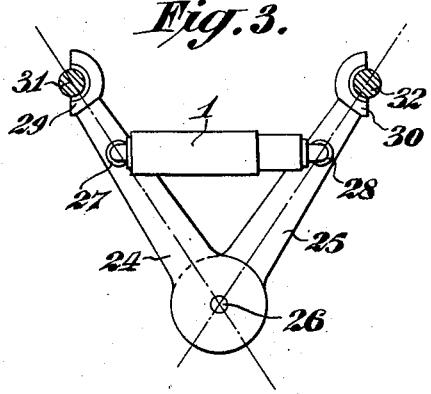
INVENTOR
George Carwardine
By [signature] Atty.

Aug. 19, 1930.   G. CARWARDINE   1,773,218
SUSPENSION FOR AUTOMOBILES AND THE LIKE
Filed Oct. 2, 1926   2 Sheets-Sheet 2
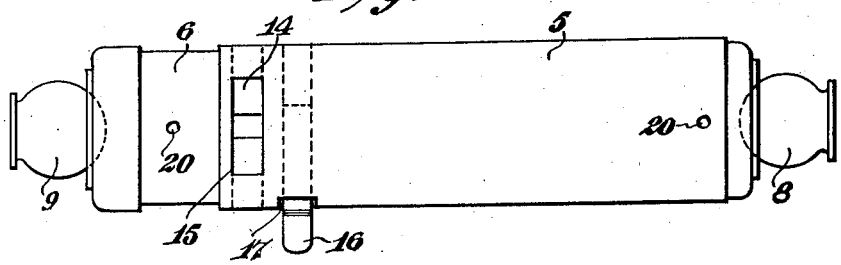
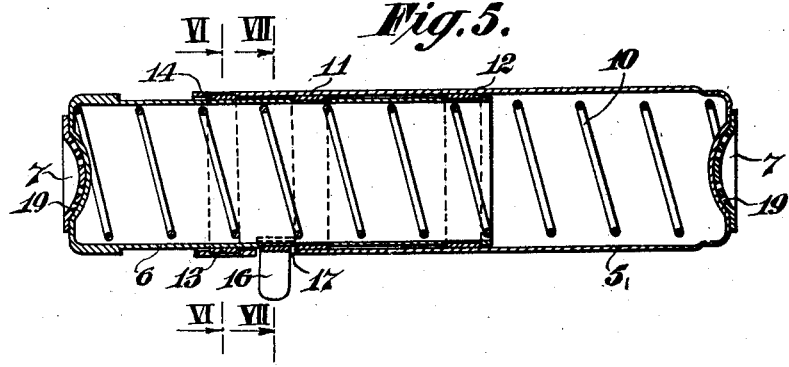
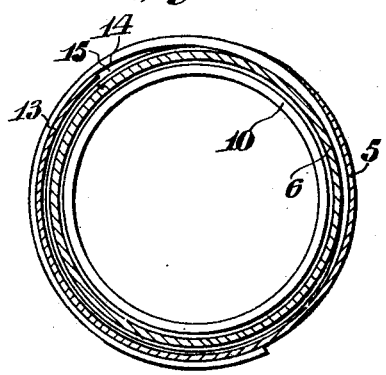 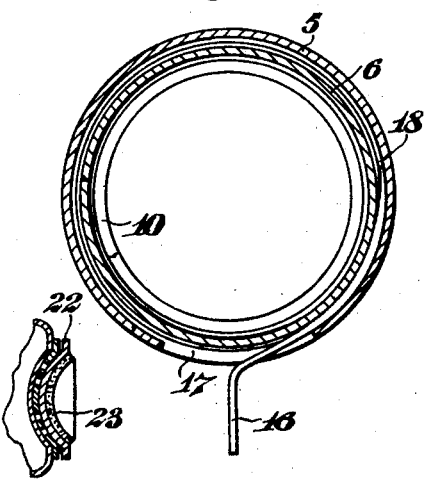
INVENTOR  
George Carwardine Patented Aug. 19, 1930

1,773,218

UNITED STATES PATENT OFFICE

GEORGE CARWARDINE, OF BATH, ENGLAND

SUSPENSION FOR AUTOMOBILES AND THE LIKE

Application filed October 2, 1926, Serial No. 139,090, and in Great Britain October 5, 1925.

This invention relates to suspensions for automobiles and the like.

In motor vehicles provided with the usual suspension systems, some of the main causes or discomfort in travelling arise from the high periodicity of the suspension and also from the variable periodicity of the suspension, as the periodicity varies with the load carried by the vehicle.

It is desirable, therefore, that the periodicity should be comparatively low and should be maintained as nearly as possible constant throughout the loading range of the vehicle.

The object of my invention is to provide an improved suspension arrangement for motor vehicles in which the periodicity may be lowered relatively to that of the usual suspension systems and at the same time maintained constant or approximately constant throughout the loading range of the vehicle.

To these ends, the invention consists in a suspension arrangement in which a complementary system is combined with any of the usual suspension systems, the complementary system having one or more resilient struts or like members interposed between the sprung and unsprung portions of the vehicle.

The invention further consists in the improved suspension arrangements, to be hereinafter described.

Referring now to the accompanying drawings,

Figure 1, shows a side elevation of a suspension arrangement, constructed according to my invention, while, Figure 2, shows a rear elevation of a modification.

Figure 3, shows a side elevation of a modified arrangement of resilient strut.

Figure 4, shows an elevation of a resilient strut as embodied in the arrangement shown in Figures 1, 2 and 3.

Figure 5, shows a longitudinal section of the strut shown in Figure 4.

Figures 6 and 7, show cross-sections through the lines VI—VI, and VII—VII, respectively on Figure 5.

Figure 8, shows a detail view of a damping arrangement for the struts shown in Figures 4 to 7.

In carrying my invention into effect, according to one form and as applied by way of example to the rear axle of a motor car, in addition to the usual springs for supporting the chassis, a complementary suspension system consisting of a resilient strut, 1, is interposed between the transverse member, 2, of the chassis frame and the rear axle casing, 3, so that the strut is disposed centrally relatively to the chassis frame.

In the normally loaded static condition of the vehicle, the centre line of the strut produced passes through the centre of the universal joint about which the torque tube, 4, oscillates.

The strut, 1, consists of two members, 5 and 6, Figures 4 to 7, which telescope into one another, depressions, 7, forming part of a spherical surface, being provided in the ends of these members as shown in Figure 5. On the transverse member, 2, and on the rear axle casing, 3, ball-headed projections, 8 and 9, are arranged for engaging with the depressions, 7, on the members, 5 and 6, respectively.

Between the members, 5 and 6, the spring, 10, is interposed, as shown in Figure 5, while bearing rings, 11 and 12, are arranged on the member, 6.

On the internal periphery of the member, 5, a groove, 13, is formed, into which a split-ring, 14, is adapted to be introduced in the manner hereinafter described.

The groove, 13, is of less depth than the split-ring, 14. The split-ring, 14, when in position in the groove, 13, is adapted to act as a stop for the bearing ring, 11, and limit the outward relative movement of the members, 5 and 6.

The split ring, 14, is sprung over the member, 5, externally and is introduced into the groove, 13, by pressing one of its ends into the slot, 15, formed in the member, 5, and rotating the ring relatively to the member, 5, until both of its ends lie in the slot, 15, as shown in Figures 4 and 5. In Figure 6, the split-ring, 14, is shown partially introduced into the groove, 13, while in Figure 5, the split-ring is shown in position.

The split-ring, 14, may be removed from the groove, 13, by springing one of its ends out of the slot, 15, and rotating the ring relatively to the member 5, until the other end of the ring is withdrawn from the groove, 13, and the ring rests on the external surface of the member, 5.

A supplementary stop, 16, may also be arranged on the strut, 1, so that one of the ends of the stop may be introduced through the slot, 17, into the internal groove, 18, in the member, 5 and contact with the ring, 11, thus retaining the members, 5 and 6, in an intermediate position.

In assembling the strut, 1, on the vehicle, the members, 5 and 6 of the strut are forced together and the supplementary stop, 16, inserted so as to engage with the bearing ring 11, and hold the members, 5 and 6, with the spring, 10, in a somewhat compressed condition. The chassis is then jacked-up only a sufficient distance to allow the ends of the strut to engage with the ball-headed projections, 8 and 9, after which the stop, 16, is withdrawn. The necessity for jacking-up the chassis the full distance to permit the strut to be inserted at its maximum extension is thus avoided.

The depressions, 7, on the ends of the members, 5 and 6, may be provided with holes or recesses, 19, so as to retain lubricant therein. Vent holes, 20, for air are provided on the members, 5 and 6.

In Figure 2, an arrangement of a complementary suspension system is shown in which two resilient struts, 1, are arranged transversely on the chassis, the outer ends of the struts bearing against ball-headed projections, 8, on the longitudinal members, 21, of the chassis frame, while their inner ends bear against similar projections, 9, on the rear axle casing 3.

The struts, 1, in Figure 2, are shown in the position for the normally loaded static condition of the vehicle.

The bearings on the ends of the resilient struts, may in same cases, be arranged to increase the damping of the oscillations of the suspension system by increasing the friction at the bearings.

In Figure 8, hemispherical flanged members, 22, are interposed between the ball-headed projections on the chassis frame and rear axle casing and the ends of the struts. The inner surface, 23, of the members, 22, are lined with friction material. The clearance between the flanges of the members, 22, and the ends of the struts permits a certain amount of angular play independent of the resistance provided by the friction material.

Instead of inserting a resilient strut, or two resilient struts directly between the sprung and unsprung portions of the vehicle, I may interpose pivoted arms between the struts and the sprung and unsprung portions and in Figure 3, I have shown an example of a strut combined with pivoted arms which may be substituted for the struts in the arrangements shown in Figures 1 and 2. In this figure, the arms 24, and 25, are pivoted on the pin, 26. On the arm, 24, a ball-headed member, 27, is mounted, while a similar member, 28, is mounted on the arm, 25.

Between the ball-headed members, 27 and 28, a resilient strut, 1, of similar construction to that shown in Figures 4 to 7, is interposed. The arms, 24 and 25, are formed with semi-cylindrical bearings, 29 and 30, on their ends, engaging with bearing-pins, 31 and 32, mounted on the rear axle casing and the longitudinal or transverse members of the chassis frame, as the case may be.

In the normally loaded static condition of the vehicle, the centre line of the resilient strut in the arrangement shown in Figure 1, passes through the centre of oscillation of the torque tube, 4, as stated above, while in the arrangement shown in Figure 2, in the above condition of the vehicle, the centre lines of the struts are parallel to the rear axle. If, in the above arrangement, struts, combined with the pivoted arms, as shown in Figure 3, are substituted for the struts alone, the centre lines of the struts so combined should conform to the above conditions when the vehicle is in the normally loaded static condition.

In the normally loaded static condition of the vehicle, in the arrangements hereinbefore described, the struts are in a dead centre position, the term "normally loaded" being intended to denote the condition of the vehicle when the weight of the driver only is carried thereon. When the load is increased above the normal, the action of the struts is opposed to that of the usual suspension springs, the action of the struts progressively increasing with the increase of the load.

By suitably designing the complementary system, the periodicity of the combined arrangement may be lowered as desired and at the same time maintained constant or approximately constant throughout the loading range of the vehicle. As the above arrangements permit of the use of comparatively long struts, and as the length of the strut is a function of an element of the load-deflection curve of constant periodicity, a resultant load-deflection curve for the combined arrangement of the complementary system with any of the usual suspension systems, may be obtained which approximates within 1% to a curve with the equation $y = e^{ax}$, and $dy/dx = ae^{ax}$, where, $a$, is the reciprocal of the subtangent to the curve and is constant. The equation $y = e^{ax}$, is the equation to a load-deflection curve for a suspension with a constant periodicity.

By suitably disposing the centres of the members, 27 and 26, Figure 3, relatively to the centre lines of the arms, 24 and 25, an even closer approximation to the theoretical curve for constant periodicity may be obtained in the resultant load-deflection curve for the combined arrangement of the complementary system with any of the usual suspension systems.

With the suspension arrangements above described, the rolling period of the sprung portions of the vehicle will be practically unaffected and the normal vertical period of the sprung portions may be lowered as desired without destroying the stability of the vehicle when cornering.

Any of the usual spring-damping arrangements may be incorporated to provide a check for excessive spring movements.

By means of my invention, an improved suspension arrangement is provided in which the periodicity may be lowered as desired and in which it may be maintained practically constant for the loading range of the vehicle to which the arrangement is applied.

I wish it to be understood that the above examples of my invention are to be regarded as typical only and not as limiting my invention thereto as modifications may be made in the details thereof and also in the positions in which the complementary systems before described may be interposed between the sprung and unsprung portions of the vehicle.

I claim:—

1. In a suspension system for vehicles, the combination with the usual springs between the chassis and the running gear, of means for stabilizing the vehicle under static load comprising a device including telescopically interfitting members pivotally mounted between abutments on the chassis and the running gear, and a spring confined within said telescopically interfitting members under maximum compression when the vehicle is under static load, the said abutments being arranged to separate when the usual springs of the vehicle are subjected to a greater load than the static load, thereby lessening the compression of the spring and removable means insertable between the adjacent faces of said members to limit relative outward movement thereof under the influence of said spring when the device is separated from the vehicle.

2. In a suspension system for vehicles, the combination with the usual springs between the chassis and the running gear, of means for stabilizing the vehicle under static load comprising a strut consisting of telescoping tubes, a spring within said tubes normally under compression, means carried by the sprung and unsprung parts of the vehicle for pivotally supporting the ends of said struts, an abutment carried by one of said tubes, the other of said tubes having a slot, and a stop member insertable through said slot for cooperation with said abutment to limit relative outward movement of said tubes under the influence of said spring when the strut is disengaged from the vehicle.

3. A vehicle stabilizing device adapted to be inserted between the frame and the running gear of a vehicle, comprising a pair of telescopically connected tubes, an expansion spring within said tubes, cooperating abutments carried by said tubes to limit relative outward movement thereof under the influence of said spring, and a member insertable between said abutments to restrict the permissible amount of outward movement of said tubes.

In testimony whereof I have affixed my signature hereto this 21st day of September, 1926.

GEORGE CARWARDINE.